United States Patent [19]

Fork

[11] 3,976,917

[45] Aug. 24, 1976

[54] PROTECTION DEVICE FOR A POWER PLANT TO PREVENT OVERLOADING IN THE EVENT OF SHORT CIRCUITS

[75] Inventor: Kurt Fork, Erlargen, Germany Germany

[73] Assignee: Kraftwerk Union Aktiengesellschaft, Mulheim (Ruhr), Germany

[22] Filed: Mar. 12, 1975

[21] Appl. No.: 557,606

[30] Foreign Application Priority Data

Mar. 29, 1974 Germany.......................... 2415448

[52] U.S. Cl. ................................ 317/13 R; 317/47
[51] Int. Cl.² ........................................ H02H 7/06
[58] Field of Search ................. 317/13 R, 36 D, 38, 317/47; 322/29, 32

[56] References Cited
UNITED STATES PATENTS

| 2,953,722 | 9/1960 | Willis | 317/47 X |
| 3,405,320 | 10/1968 | Schwanenflugel | 317/47 X |
| 3,546,533 | 12/1970 | Lydick | 317/13 R |
| 3,622,208 | 11/1971 | Krugler | 317/5 X |

Primary Examiner—J D Miller
Assistant Examiner—Harry E. Moose, Jr.
Attorney, Agent, or Firm—Herbert L. Lerner

[57] ABSTRACT

An overload protection device for a turboset including an alternating current generator, a turbine for the drive thereof, and a network supplied from the generator when disconnecting any short circuit within the network comprises a memory connected to the generator for storing a voltage vector corresponding to positive sequence components obtained therefrom prior to the occurrence of a fault in the network, a comparison circuit connected to the memory and to the generator for comparison of of the stored voltage vector with a voltage vector corresponding to positive sequence components obtained from the generator following occurrence of the fault to generate a difference value, and a switch interconnected between the network and the generator for being released upon the difference value exceeding a predetermined value.

4 Claims, 2 Drawing Figures

PROTECTION DEVICE FOR A POWER PLANT TO PREVENT OVERLOADING IN THE EVENT OF SHORT CIRCUITS

The invention relates to a protection device for a turboset including a generator and a turbine to prevent overloads thereof when disconnecting and possibly reconnecting short-circuits which have occurred in a network supplied by the generator and particularly to prevent damage to the shaft of the generator and/or its coils, armature and stator.

To supply large networks with electric current a plurality of turbosets consisting of a generator and a turbine respectively are connected to such a network. A multiplicity of protection devices are provided for such turbosets or power plants, as well as for the individual parts of the network.

If a short-circuit, or any other serious fault occurs anywhere in the network, then switches adjoining the fault location are opened by installed network protection devices, the fault location thus being switched out of the network. To prevent a length interruption of the current supply due to short term faults, the faulty section of the network is switched in after a relatively short time, particularly in the case of overhead transmission lines, to ascertain whether the fault still exists. (Continuous short-circuit switching-operation).

If a fault of this type occurs in the network in the vicinity of the power plant, resulting in a considerable voltage reduction at the output thereof, respective switching-in and switching out of a section of the network can lead to a very high stress exerted on the shaft of the power plant and the coils, e.g. the armature and the stator of the generator. The reason for this is primarily due to the fact that the synchronizing forces of the network during occurrence of short-circuits in the immediate vicinity of a power plant are very small. Considerable differences can therefore occur between the voltage vector supplied by the generator prior to the occurrence of a fault and that supplied thereby following occurrence of such a fault; this is due to the driving power of the generator remaining unchanged while the considerable reduction of the generator's output due to the short-circuit can cause a considerable angular difference between the voltage vector of the generator prior to the occurrence of a fault and the voltage vector across the network, and hence across the generator following such a fault.

It is accordingly an object of the invention to obviate the aforesaid disadvantages and in particular to devise a protection device preventing the generator and/or the turbine from being exposed to any excessive stresses when disconnecting any short circuits.

It is well known in electrical power technology that three vectors in an unbalanced three-phase network may be synthesized from a set of nine vectors, three of these vectors being called zero sequence components, another three of these vectors being called positive sequence components, and the remaining three vectors being denoted as the negative sequence components, as, for example, described in Electrical Engineer's Handbook, Pender, Delmar, John Wiley & Sons, Inc. 1936, pp. 3–32 to 3–34. In the following description of instant invention, the three vectors called the positive sequence components will be simply referred to as the voltage vector of the positive sequence components.

It is therefore proposed, according to the invention, to open a master switch disposed between the generator and the network firstly if the voltage vector of the positive sequence components decreases by a relatively smaller amount, provided the vectorial difference between the voltage vector supplied by the generator followed the occurrence of a fault, and the voltage vector supplied by the generator prior to the occurence of such a fault exceeds a predetermined amount.

In order to synchronize the power plant more quickly with the network following the disconnection or removal of a fault, it is particularly advantageous if concurrently with the disconnection of the generator from the network load, a resistance is shunted across the output terminals thereof. The frequency difference between the generator and the connecting network can then be kept small.

Other features which are considered as characteristic for the invention are set forth in the appended claims.

Although the invention is illustrated and described herein as embodied in a protection device for a power plant to prevent overloading in the event of short circuits, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which.

Figure 1:
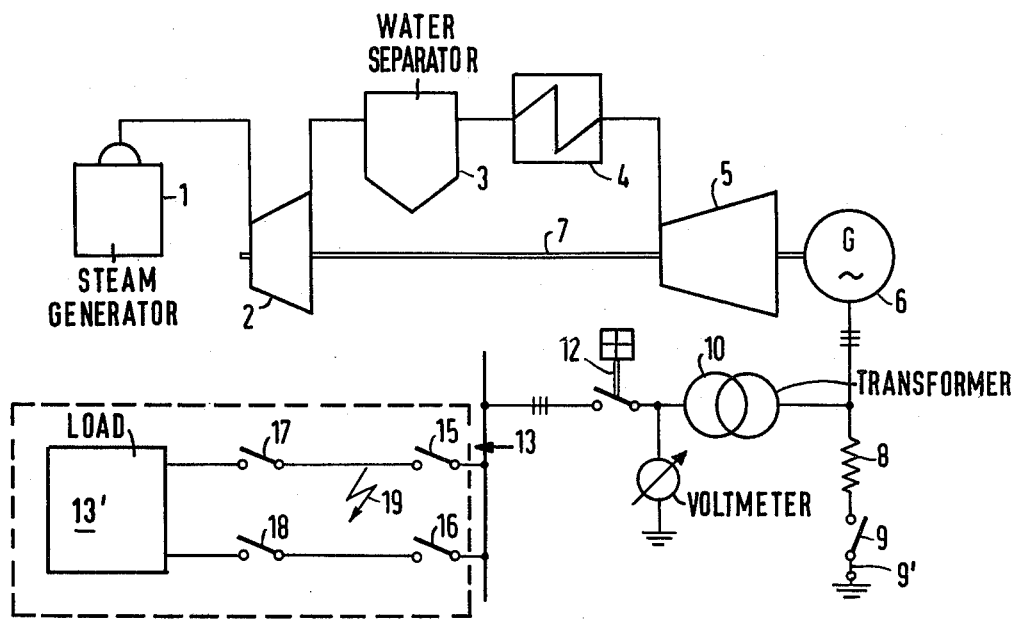
FIG. 1 shows a power plant feeding a network.

The turbine stages 2 and 5 are driven by a steam generator 1 through an interposed intermediate superheater 4 and a water separator 3. The turbine stages 2 and 5 are connected with the generator 6 through a shaft 7. The output terminals of the generator 6 are connected to a resistance which may be shunted across thereof by a switch 9 and/or a switch 9', the switches being connected in series.

The output terminals of the generator are also connected to a transformer 10, the high-tension winding of which is connected to a voltage indicator 11, and are further connected to the network or the load by means of a master switch 12 which connects the power plant to the load 13' or to the network 13. It is assumed that the network 13 is supplied with a multiplicity of other generators, so that additional switches 15 to 18 are disposed in the network; a fault 19 is assumed to exist between switches 15 and 17.

Figure 2:
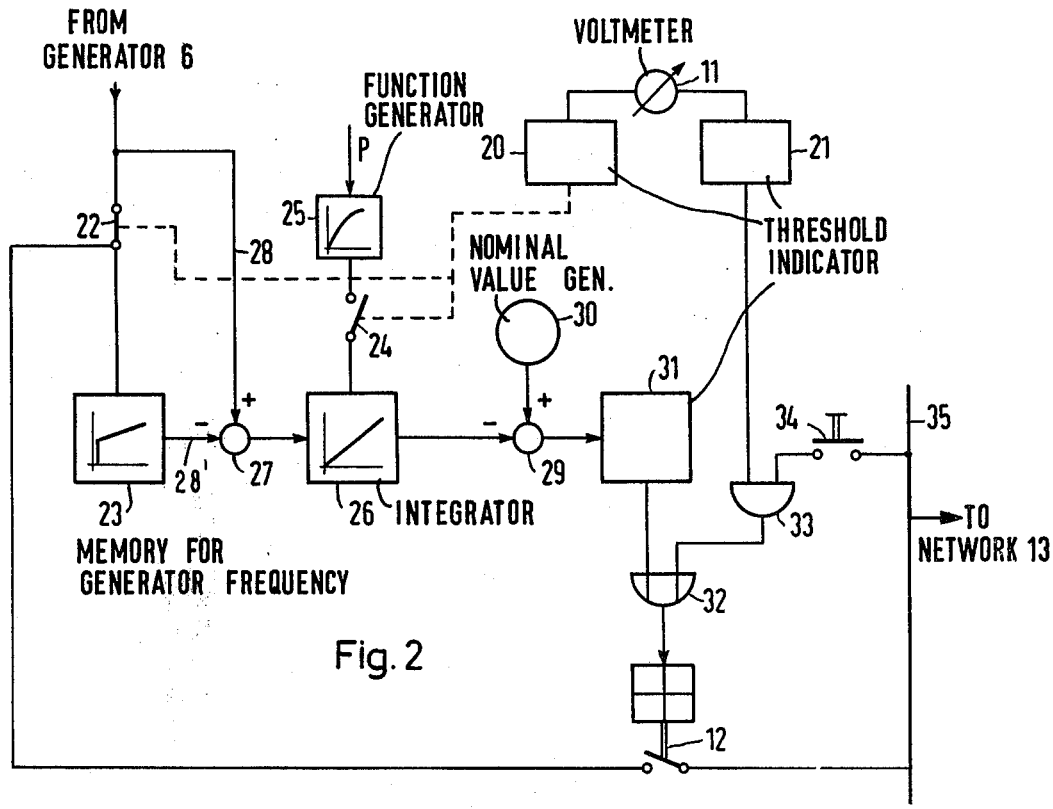
FIG. 2 shows a circuit for releasing the master switch inserted between the network and the power plant.

FIG. 2 shows a circuit for actuation of the master switch 12 in dependence of the value read by the voltage indicator 11.

In lieu of the master switch 12 being disposed on the high voltage side of the transformer 10, the power plant could also be switched out by a switch disposed between the generator 6 and the transformer 10.

The output of the voltage indicator 11 is fed to two threshold indicators 20 and 21 shown in FIG. 2 The threshold indicator 20 is adjusted to furnish an output signal, if the voltage indicator 11 registers a low voltage due to a short circuit in the network.

The output of the threshold indicator 20 is fed to a switch 22, which is precoupled to a memory 23, which continuously stores a voltage proportional to the network's frequency. The memory 23 can be implemented, for example, by a conventional frequency or phase discriminator, followed by an anolog-to-digital converter, followed by a digital memory, an optional delay circuit and a digital-to-analog converter. The output of the threshold indicator 20 is additionally fed to a switch 24, disposed between a function generator 25 and an integrator 26. A comparison circuit 27 is disposed ahead of integrator 26, which in turn receives the voltage stored in the memory 23 and the voltage proportional to the generator frequency through respective lines 28' and 28 and provides an output yielding the difference between these two voltages. The output of the integrator 26 is fed to an additional comparison circuit 29, which compares the output of the integrator 26 with a value supplied by a nominal or rated value generator 30. The permissible deviation of the voltage vector of the generator from the voltage vector of the network assumed to be invariant is adjusted in the nominal value indicator 30. The comparison circuit 29 feeds a threshold indicator 31 and an OR circuit 32, the output of the latter feeding the output coil of the switch 12. An AND circuit 33 is disposed ahead of an additional input of the OR circuit 32, the latter's inputs being respectively connected on one hand to a switch 34 which is in the ON position if the network is connected to the generator, and hence to a signal busbar 35 and on the other hand to the output of the threshold indicator 21. The threshold indicator 21 is so adjusted as to provide an output signal if a considerable voltage reduction is registered by the voltage indicator 11, so that in the event no other fault is present in the generator which would normally be taken care of by other protection devices, it is assumed that a short-circuit exists in the immediate vicinity of the generator.

The voltage indicator 11 includes means to obtain the voltage vector of positive sequence components from the secondary winding of the transformer 10, since the measurement should only include the positive sequence components, faults or loads of an asymmetric nature being avoided thereby.

During undisturbed operation of the network, a value corresponding to the prevailing frequency is stored in the memory 23. If, however, the voltage decreases as a result of a short circuit, then the threshold indicator 20 furnishes an output signal. This results in closure of the switch 24 and in an opening of the switch 22. At this time the function generator 25 furnishes to the integrator 26 an output value and the memory 23 retains the last stored value.

If, as a result of a fault, there occurs a change in the angle of the voltage vector of the positive sequence components of the generator with respect to the relative angle of the voltage vector of the positive sequence components of the network rotating at the same frequency, then that angular difference between the voltage vector of the generator prior to the occurrence of a fault, and following such an occurrence results in an output of the comparison circuit 27, since the memory 23 introduces a delay; this resultant output of the memory 23 causes the integrator 26 to operate.

In the integrator 26 there is therefore stored a value which corresponds to the angular difference of the voltage vector of the positive sequence components of the generator to a corresponding voltage vector of the generator during fault free operation of the network, it being assumed that the generator frequency remains the same. This angular difference is compared in the comparison circuit 29 with a value considered permissible, the nominal value generator 30 being adjusted so that permissible value. If that permissible value is, however, exceeded, then the threshold indicator 31 is activated and causes disconnection of the master switch 12 by means of the OR circuit 32.

If, however, a considerable reduction of the voltage vector of the positive sequence components results (for example, 20% of the nominal value), then the threshold indicator 21 also furnishes an output signal. This causes the OR circuit 32 to furnish an output signal since its remaining input still receives a signal from the AND circuit 33 in the event that the switch 34 remains closed. The output signal of the AND circuit 33 then activates the master switch 12 through the OR circuit 32, so that the generator is disconnected from the network load even before the short circuit has been isolated and removed from the network. A synchronization device not shown in the drawing is used to reconnect the master switch 12, thus avoiding with certainity any impermissible torque impulses on the shaft 7. To shorten the time required for resynchronization of the power plant, the switch 9 can be closed concurrently with the opening of the master switch 12. This prevents an increase of the frequency of the generator more quickly than would be possible by closure of the valves of the turbine. The non-illustrated synchronization device can then reconnect the power plant upon removal of the short-circuit relatively quickly with the load.

In order to switch the resistor 8 in and out of the circuit it is advantageous to use two switches, one of the switches having a particularly short closure time and the other a particularly short opening time. These switches must then be so arranged that if the resistor 8 is switched out of the circuit the switch having a particularly short closure time stays open and the remaining switch is closed, the switches 9 and 9' assuming respectively opposite positions if the resistor 8 is to stay in the circuit.

It is claimed:

1. An overload protection device for a turboset including an alternating-current generator, a turbine for the drive thereof, and a network supplied from the generator when disconnecting any short circuit within the network, comprising:

memory means connected to the generator for storing a voltage vector corresponding to positive sequence components obtained therefrom prior to the occurrence of a fault in the network;

comparison means connected to said memory means and to the generator for comparison of the stored voltage vector with a voltage vector corresponding to the positive sequence components obtained from the generator following occurrence of said fault and for generating a difference value; and switch means interconnected between the network and the generator for being released upon said difference value exceeding a predetermined value.

2. An overload protection device according to claim 1 wherein said memory means further comprises:

first storage means for memorizing the frequency furnished by the generator;

integrator means postcoupled to said first storage means and connected to the output of said comparison means for integrating the difference between the frequency supplied by the generator following said fault and the frequency stored in said second storage means prior to the occurrence of said fault, the integrated difference being said difference value; and second comparison means connected to said integrator means for receiving said difference value and for release of said switch means upon said difference value exceeding a predetermined value.

3. An overload protection device according to claim 1, further comprising second switch means and a resistor in series therewith, the series combination thereof shunting the output of the generator, said second switch means being closed upon opening of said first switch means.

4. An overload protection device according to claim 3, further comprising third switch means in series with said second switch means for respective rapid closing and opening of said second and third switch means.

* * * * *